US008785780B2

(12) United States Patent
Gaubert et al.

(10) Patent No.: US 8,785,780 B2
(45) Date of Patent: Jul. 22, 2014

(54) ELECTRICAL TERMINATION FOR EXTRA HIGH VOLTAGE

(75) Inventors: Jean-Bernard Gaubert, Hyeres (FR); Pascal Streit, Le Mont-sur-Lausanne (CH); Pierre Mirebeau, Villebon S/Yvette (FR)

(73) Assignee: Nexans, Paris (FR)

( * ) Notice: Subject to any disclaimer, the term of this patent is extended or adjusted under 35 U.S.C. 154(b) by 247 days.

(21) Appl. No.: 13/290,245

(22) Filed: Nov. 7, 2011

(65) Prior Publication Data
US 2012/0138360 A1   Jun. 7, 2012

(30) Foreign Application Priority Data

Dec. 1, 2010   (FR) ...................................... 10 59971

(51) Int. Cl.
*H02G 15/02*   (2006.01)
*H02G 15/00*   (2006.01)
*H02G 15/04*   (2006.01)
*H01B 17/26*   (2006.01)

(52) U.S. Cl.
USPC ........ 174/74 A; 174/73.1; 174/74 R; 174/142

(58) Field of Classification Search
USPC .............................. 174/73.1, 74 A, 74 R, 142
See application file for complete search history.

(56) References Cited

U.S. PATENT DOCUMENTS

| 6,265,663 | B1 * | 7/2001 | Cicogna et al. | 174/73.1 |
| 6,333,462 | B1 * | 12/2001 | Quaggia | 174/74 R |
| 6,677,528 | B2 * | 1/2004 | Amerpohl et al. | 174/73.1 |
| 2003/0003802 | A1 * | 1/2003 | Amerpohl et al. | 439/587 |
| 2006/0249297 | A1 * | 11/2006 | Janah et al. | 174/73.1 |

FOREIGN PATENT DOCUMENTS

JP   H11-203970   7/1999

* cited by examiner

*Primary Examiner* — Jeremy C Norris
*Assistant Examiner* — Sherman Ng
(74) *Attorney, Agent, or Firm* — Sofer & Haroun, LLP

(57) ABSTRACT

A termination for extra high voltage includes, around a central conductor (1), a deflector cone (2) made of flexible material covered by a polymer insulator having a first internal insulating element (3) and containing a conducting deflector (5), the conductor (1) is connected to an output terminal (6). The maximum diameter (D) of the first insulating element (3) at right angles to the length (L) of the deflector cone (2) included between the conducting deflector (5) and the adjacent end of the output terminal (6) is greater than or equal to double the maximum diameter ($d_1$) of the conducting deflector (5).

7 Claims, 1 Drawing Sheet

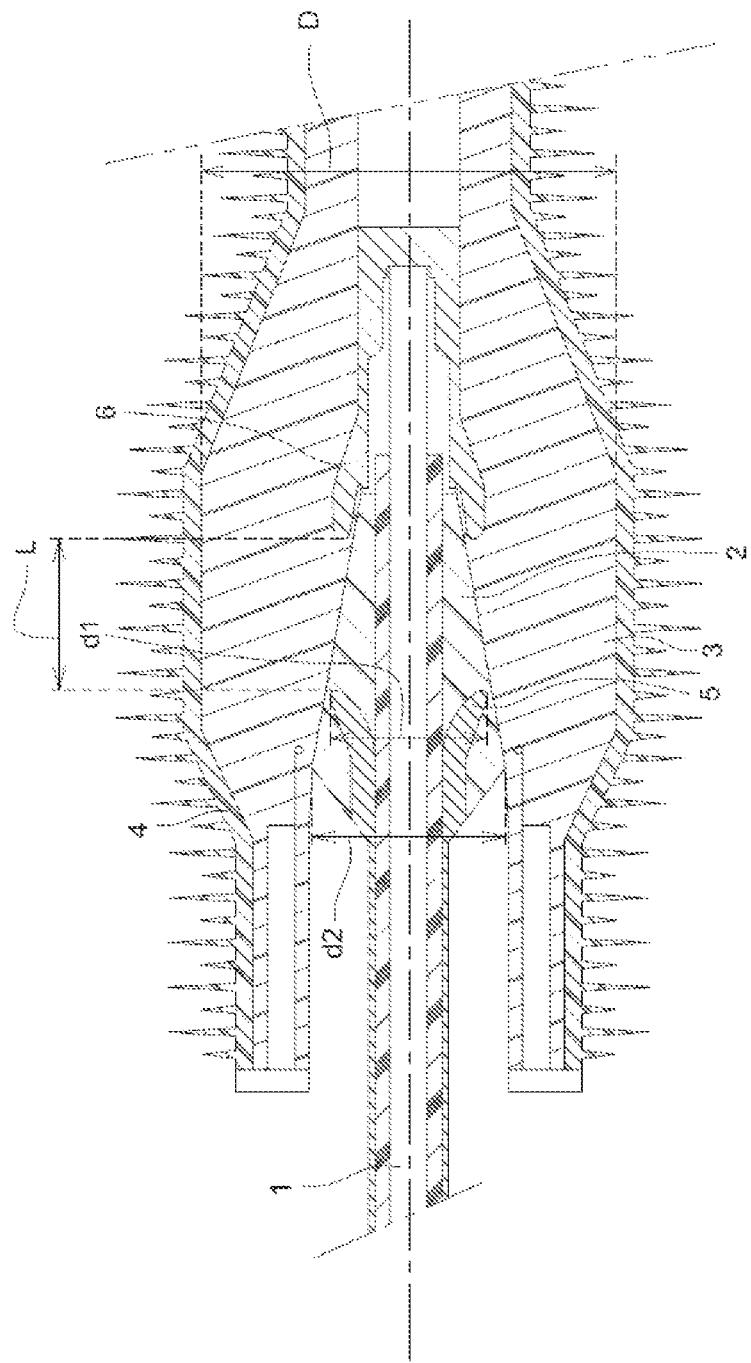

ELECTRICAL TERMINATION FOR EXTRA HIGH VOLTAGE

RELATED APPLICATION

This application claims the benefit of priority from French Patent Application No. 10 59971, filed on Dec. 1, 2010, the entirety of which is incorporated by reference.

BACKGROUND

1. Field of the Invention

The invention relates to an electrical termination for extra high voltage.

2. Description of Related Art

Recent years have seen the development of polymer insulators comprising an internal insulating cylinder and an external cylinder covering the foregoing. A plastic reinforced with glass fibers or equivalent, having good insulating properties and good strength, can be used for the internal cylinder and a polymer, for example a silicone rubber, can be used for the external cylinder which comprises external fins.

Such insulators have the advantage of being light and easy to handle. Furthermore, they provide increased safety in the event of an internal fault relative to porcelain insulators which can explode and spray debris and to oil-filled insulators that can be released and burn.

The document of patent JP H11-203970 describes such a termination which comprises two essential elements, a polymer insulator and a deflector cone made of flexible material contained in this insulator.

OBJECTS AND SUMMARY

The object of the invention is to perfect the electrical performance of such a termination in particular at high voltage. Specifically, at voltages of more than 220 kV, a termination as described in this earlier document poses a problem of leakage current.

To solve this problem, the invention proposes a termination for extra high voltage comprising, around a central conductor, a deflector cone made of flexible material covered by a polymer insulator comprising a first internal insulating element and containing a conducting deflector, said conductor being connected to an output terminal, characterized in that the maximum diameter of said first insulating element at right angles to the length of said deflector cone included between said conducting deflector and the adjacent end of said output terminal is greater than or equal to double the maximum diameter of said conducting deflector.

According to a preferred embodiment, the maximum diameter of said deflector cone is less than ⅔ of said maximum diameter of said first insulating element.

Preferably, the maximum diameter D of the first insulating element is defined as a function of said length L of the deflector cone by the following function: $D=-f(V) \times L + k \times V$, where v is the impulse voltage for which the termination is designed, $f(V)$ is between 0.25 and 0.4 and k is between 0.5 and 0.7.

Preferably, said insulator comprises a second internal insulating element covering said first insulating element and having external fins.

Said deflector cone may be made of silicone rubber.

Said first insulating element may be made of epoxy resin reinforced with mineral additives.

Said second insulating element may be made of silicone rubber.

BRIEF DESCRIPTION OF THE DRAWINGS

The invention is described below in greater detail with the aid of a sole FIGURE representing a termination in accordance with one preferred embodiment of the invention.

DETAILED DESCRIPTION

A termination comprises, around a central conductor 1, a deflector cone 2 made of flexible material, preferably of silicone rubber, covered by a polymer insulator comprising a first element consisting of an internal insulating cylinder 3, preferably made of epoxy resin reinforced with mineral additives, and a second element consisting of an external insulating cylinder 4, preferably made of silicone rubber, covering the first cylinder 3 and having external fins.

The deflector cone 2 contains a semiconducting rubber deflector 5. The conductor 1 is connected at its end to an output terminal 6 of the termination.

The maximum diameter D of the first cylinder 3 at right angles to the length L of the deflector cone 2 between the conducting deflector 5 and the adjacent end of the output terminal 6 is greater than or equal to double the maximum diameter $d_1$ of the conducting deflector 5.

The diameter of the deflector cone 2, and therefore its maximum diameter $d_2$, is less than ⅔ of this maximum diameter D of the first cylinder.

Preferably, the maximum diameter D of the first cylinder is defined as a function of this length L of the deflector cone by the following function: $D=-f(V) \times L + k \times V$, where V is the impulse voltage for which the termination is designed, $f(V)$ is between 0.25 and 0.4 and k is between 0.5 and 0.7.

As examples, $f(V)$ is advantageously of the order of 0.28 for a voltage of 170 kV, of the order of 0.39 for a voltage of the order of 245 kV and of the order of 0.34 for a voltage of 420 kV.

The invention applies in particular to extra high voltages conventionally between 225 and 550 kV.

The invention claimed is:

1. A the termination for extra high voltage comprising:
   around a central conductor, a deflector cone made of flexible material covered by a polymer insulator having a first internal insulating element and containing a conducting deflector, said conductor being connected to an output terminal,
   wherein the maximum diameter (D) of said first insulating element, at right angles to the length (L) of said deflector cone, included between said conducting deflector and the adjacent end of said output terminal, is greater than or equal to double the maximum diameter ($d_1$) of said conducting deflector.

2. The termination according to claim 1, wherein the maximum diameter ($d_2$) of said deflector cone is less than ⅔ of said maximum diameter (D) of said first insulating element.

3. The termination according to claim 1, wherein said maximum diameter D of the first insulating element is defined as a function of said length L of the deflector cone by the following function:
   $D=-f(V) \times L + k \times V$, where v is the impulse voltage for which the termination is designed, $f(V)$ is between 0.25 and 0.4 and k is between 0.5 and 0.7.

4. The termination according to claim 1, wherein said insulator comprises a second external insulating element covering said first insulating element and having external fins.

5. The termination according to claim 1, wherein said deflector cone is made of silicone rubber.

6. The termination according to claim 1, wherein said first insulating element is made of epoxy resin reinforced with mineral additives.

7. The termination according to claim 4, wherein said second insulating element is made of silicone rubber.

\* \* \* \* \*

UNITED STATES PATENT AND TRADEMARK OFFICE
CERTIFICATE OF CORRECTION

| | | |
|---|---|---|
| PATENT NO. | : 8,785,780 B2 | Page 1 of 1 |
| APPLICATION NO. | : 13/290245 | |
| DATED | : July 22, 2014 | |
| INVENTOR(S) | : Gaubert et al. | |

It is certified that error appears in the above-identified patent and that said Letters Patent is hereby corrected as shown below:

In the Claims

Column 2, Claim 1, Line 41: The word "the" between the words "A" and "termination" should be removed.

Signed and Sealed this
Thirtieth Day of September, 2014

Michelle K. Lee
*Deputy Director of the United States Patent and Trademark Office*